Patented Apr. 12, 1949

2,466,737

UNITED STATES PATENT OFFICE 2,466,737

ACYLATIONS WITH ENOL ESTERS

William M. Quattlebaum, Jr., and Charles A. Noffsinger, Charleston, W. Va., assignors to Carbide and Carbon Chemicals Corporation, a corporation of New York No Drawing. Application June 6, 1944, Serial No. 539,024

11 Claims. (Cl. 260—491)

This invention relates to the acylation of aldehydes and ketones using as the acylating agent an enol ester of a ketone, as in the preparation of acetoxystyrene from acetophenone and isopropenyl acetate.

It is known that aldehydes and ketones may form enol esters of the general formula

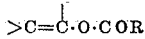

For the preparation of certain enol esters it has been proposed to acetylate with acetic anhydride in the presence of sodium acetate catalyst, as for instance in the production of acetoxybutadiene, $CH_2=CHCH=CHOCOCH_3$, from crotonaldehyde and acetic anhydride, in the presence of a large amount of anhydrous sodium acetate. Separation of the acetoxybutadiene from unreacted acetic anhydride is difficult because of the small difference in boiling points, while a separation by hydrolysis results in considerable loss of the anhydride as dilute acetic acid.

This invention is based on our discovery that an aldehyde or ketone containing an active or migratory hydrogen atom on the carbon atom adjacent the carbonyl group or on a carbon atom joined to the carbonyl group by one or more vinyl groups, $=C:C=$, may be converted to the acyl ester of the enol form thereof by reacting such aldehyde or ketone with an enol ester of a ketone. The over-all result of such reaction is that the ester-acyl group of the acylating agent is transferred to the compound to be acylated, and the compound then becomes esterified in its enolic form while the ketone-residue of the acylating agent reverts to its ketone form. The reaction which appears to be of broad applicability may be illustrated for aldehydes containing the groups

and ketones containing the group >CH·CO— by the following general equations:

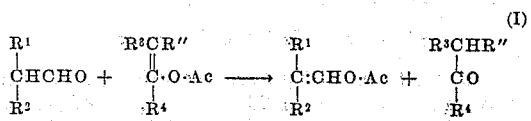

in which R″, R¹ and R³ may each be hydrogen, aliphatic, or aromatic; R² and R⁴ may each be aliphatic or aromatic; R¹ and R² taken together may be part of a cycloaliphatic ring; R³ and R⁴ taken together may be part of a cycloaliphatic ring and Ac is an acyl group, either aliphatic or aromatic;

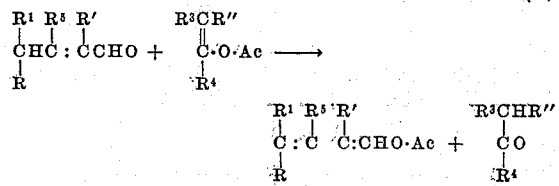

in which R, R′, R″, R¹, R³, and R⁵ may be hydrogen, aliphatic or aromatic; R⁴ may be aliphatic or aromatic; R³ and R⁴ taken together may be part of a cycloaliphatic ring and Ac is an acyl radical, either aliphatic or aromatic; and

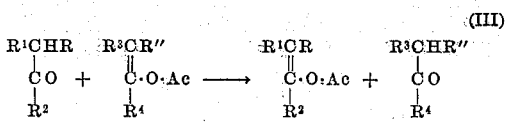

in which R, R″, R¹ and R³ may each be hydrogen, aliphatic, or aromatic; R² and R⁴ may be aliphatic or aromatic; R¹ and R² taken together may be part of a cycloaliphatic ring; R³ and R⁴ taken together may be part of a cycloaliphatic ring; and Ac is an acyl radical, aliphatic or aromatic. By the term aliphatic it is meant to include cycloaliphatic.

Enol esters which may be used as an acylating agent for the conversion of an aldehyde or ketone to the acyl ester of its enolic form, include those esters in which a ketone, in its enol form, is esterified with such carboxylic acids as formic, acetic, propionic, butyric, pentanoic, hexanoic, heptanoic, octanoic, nonanoic, decanoic, lauric, palmitic, stearic, acrylic, crotonic, angelic, pentenoic, hexenoic, oleic, benzoic, benzylic, hexahydrobenzoic, and the like, up to and including twenty carbon atoms.

Aldehydes which may be acylated in accordance with the process of the present invention include: pentaldehydes, $C_3H_7CH_2CHO$; hexaldehydes, $C_4H_9CH_2CHO$; heptaldehydes,

octaldehydes, $C_6H_{13}CH_2CHO$; nonaldehydes, $C_7H_{15}CH_2CHO$; decaldehydes, $C_8H_{17}CH_2CHO$; lauric aldehyde, $C_{10}H_{21}CH_2CHO$; palmitic aldehyde, $C_{14}H_{21}CH_2CHO$; stearic aldehyde, $$C_{16}H_{33}CH_2CHO;$$

crotonaldehyde, $C_3H_5CHO$; ethyl crotonaldehyde and their 2-alkyl and 2-aryl monosubstituted derivatives: phenyl acetaldehyde, $C_6H_5CH_2CHO$, and the like.

Ketones which may be acylated, or the enol esters of which may serve as acylating agents include: acetone, $CH_3COCH_3$; methyl ethyl ketone, $CH_3COC_2H_5$; methyl propyl ketones, $CH_3COC_3H_7$; methyl butyl ketones, $CH_3COC_4H_9$; methyl pentyl ketones, $CH_3COC_5H_{11}$; methyl hexyl ketones, $CH_3COC_6H_{13}$; methyl heptyl ketones, $CH_3COC_7H_{15}$; methyl octyl ketones, $CH_3COC_8H_{17}$; methyl monyl ketones, $$CH_3COC_9H_{19};$$

methyl decyl ketones, $CH_3COC_{10}H_{21}$; diethyl ketone, $C_2H_5COC_2H_5$; ethyl propyl ketones, $$C_2H_5COC_3H_7;$$

ethyl butyl ketones, $C_2H_5COC_4H_9$; ethyl pentyl ketones, $C_2H_5COC_5H_{11}$; ethyl hexyl ketones, $C_2H_5COC_6H_{13}$; ethyl heptyl ketones, $$C_2H_5COC_7H_{15};$$

dipropyl ketones, $C_3H_7COC_3H_7$; propyl butyl ketones, $C_3H_7COC_4H_9$; propyl pentyl ketones, $C_3H_7COC_5H_{11}$; propyl hexyl ketones, $$C_3H_7COC_6H_{13};$$

dibutyl ketones, $C_4H_9COC_4H_9$; butyl pentyl ketones, $C_4H_9COC_5H_{11}$; dipentyl ketones, $$C_5H_{11}COC_5H_{11};$$

methyl cyclohexyl ketone, $CH_3COC_6H_{11}$; ethyl cyclohexyl ketone, $C_2H_5COC_6H_{11}$; propyl cyclohexyl ketones, $C_3H_7COC_6H_{11}$; cyclohexyl acetone, $C_6H_{11}CH_2COCH_3$; cyclohexanone, $C_6H_{10}O$; methyl cyclohexanones, $CH_3C_6H_9O$; ethyl cyclohexanones, $C_2H_5C_6H_9O$; propyl cyclohexanones, $C_3H_7C_6H_9O$; butyl cyclohexanones, $C_4H_9C_6H_9O$; acetophenone, $C_6H_5COCH_3$; tolyl methyl ketones, $CH_3C_6H_4COCH_3$; benzyl methyl ketone, $$C_6H_5CH_2COCH_3;$$

acetylacetone, $CH_3COCH_2COCH_3$.

In carrying out the acylation, the compound to be acylated may be mixed with the enol ester which is the acylating agent, and the mixture reacted in the presence of a suitable catalyst. In general, the reaction temperature may be from about 0° to 275° C., depending upon the particular compound to be acylated and the acylating agent employed. Within this range the most useful temperatures are from about 50° to 200° C., which are preferred. The reaction may be conducted either in the liquid phase, or in the vapor phase, in the presence of an acidic catalyst. It may be carried out at normal atmospheric pressure, or at higher or lower pressures if desired. A liquid phase reaction at substantially atmospheric pressure is preferred. In carrying out the liquid phase process, the reaction mixture may be heated and maintained at its refluxing temperature for over a period of one to two hours and then distilled. By selecting as the acylating agent the enol ester of a ketone having a lower boiling point than the compound being acylated, the low boiling ketone may be removed by distillation through an efficient column as it is formed, until the desired degree of conversion is attained. Thereupon, the product may be distilled under reduced pressure. Using such a procedure, acylations of compounds may be performed which cannot be carried out satisfactorily using the acid anhydride. For instance, crotonaldehyde may be acylated rapidly with a high yield using isopropenyl acetate although only a low yield of acetoxybutadiene is obtainable in the same length of time with acetic anhydride as the acetylating agent in the presence of sodium acetate catalyst. Similarly, cyclohexanone may be acetylated in as high as 90–91 per cent yield in about 1.5 hours with isopropenyl acetate, whereas Mannich and Hancu (Ber. 41, 567 (1908)) reported a yield of only 47 per cent upon boiling a mixture of cyclohexanone and acetic anhydride for 50 hours. Also, the acetylation of acetophenone with acetic anhydride proceeds at an extremely slow rate, but with isopropenyl acetate it can be completed within an hour or two.

The reaction may be catalyzed with esterification catalysts including such materials as phosphoric acid, sulfuric acid, toluene sulfonic acid and the like. The preferred catalysts are sulfuric acid and toluene sulfonic acid. The amount of catalyst used may be varied within wide limits. In general, it should not be less than about 0.05 per cent of the total reactants, by weight, and usually it is unnecessary to exceed 5 per cent. Our best results have been obtained with about 0.1 to 1 per cent of concentrated sulfuric acid by weight. Upon completion of the reaction, we prefer to neutralize the acidic catalyst with a tertiary amine, or with sodium acetate, to minimize decomposition during the purification step, but it is not essential to do so. For many purposes, a separation of the product from the catalyst by distillation under reduced pressure may be found to give satisfactory results.

Acylating agents in which the enolic form of the ketone is esterified with an acid other than acetic may be prepared by reacting the enol acetate of the ketone with the anhydride of the acid, in the presence of a suitable catalyst. For instance, isopropenyl butyrate and isopropenyl sorbate may be obtained by reacting isopropenyl acetate with butyric anhydride and sorbic anhydride, respectively, using sulfuric acid as the catalyst. Such a process for preparing enol esters by the reaction of an acid anhydride with an enol acetate, or other enol ester, forms no part of the present invention but is described and claimed in the copending application of Benjamin Phillips, Jr., filed on October 5, 1945, Serial No. 620,623.

EXAMPLE 1

1-acetoxy-2-ethyl butadiene-1,3

A mixture containing 294 parts of 2-ethyl crotonaldehyde, $CH_3CH:C(C_2H_5)CHO$, 600 parts of isopropenyl acetate, $CH_2:C(CH_3)OCOCH_3$, and 3 parts of concentrated sulfuric acid, by weight, was boiled for about four hours in a still provided with a column which was 3 feet long and packed with glass helices. Acetone, which is a by-product of the reaction, was removed by distillation until 90 per cent of the theoretical quantity had been obtained. The remaining material was then carefully fractionated. There was obtained 332 parts of 1-acetoxy-2-ethyl butadiene, $$CH_2:CHC(C_2H_5):CHOCOCH_3,$$

and 15 parts of unchanged isopropenyl acetate, representing a yield of 79 per cent, based on the ethyl crotonaldehyde, and an efficiency of 77 per cent, based on isopropenyl acetate consumed. Acetoxy-2-ethyl butadiene was found to be a colorless liquid having the following properties: boiling point, 58° C. at 10 millimeters; $n_D^{30}$, 1.4661.

When acetoxybutene, the acetic acid ester of the enol form of methyl ethyl ketone was substituted for isopropenyl acetate, as the acylating agent, the yield of 1-acetoxy-2-ethyl butadiene was 56 per cent, based on the ethyl crotonaldehyde.

EXAMPLE 2

1-acetoxybutadiene-1,3

A mixture containing 280 parts of crotonaldehyde, CH₃CH:CHCHO, 1600 parts of isopropenyl acetate and 2 parts of concentrated sulfuric acid, by weight, was boiled for about 45 minutes in a still provided with a column substantially as described in Example 1. At the end of that time the sulfuric acid which served to catalyze the reaction was neutralized with 18.6 parts of triamylamine. There was obtained 267 parts of acetoxybutadiene, containing a very small amount of acetic anhydride. Unreacted isopropenyl acetate and crotonaldehyde amounting to 1203 parts and 72 parts, respectively, were recovered. The yield and efficiency based on the crotonaldehyde were 60 per cent and 80 per cent, respectively. The efficiency based on the isopropenyl acetate was 60 per cent.

In order to remove the acetic anhydride from the product, it was distilled with steam under reduced pressure. A subsequent distillation under reduced pressure yielded 1-acetoxybutadiene-1,3 having the following properties: boiling point 51.5° C. at a pressure of 30 millimeters; $n_D^{30}$, 1.4642.

EXAMPLE 3

1-acetoxybutadiene-1,3

Acetoxybutadiene was prepared using 1.35 parts of phosphoric acid (85 per cent concentration) as the catalyst in a reaction mixture containing 350 parts of crotonaldehyde and 1000 parts of isopropenyl acetate. The procedure was substantially the same as described in Example 2. The amount of acetoxybutadiene obtained was 177 parts, and the amount of unreacted isopropenyl acetate recovered was 498 parts. Based on the crotonaldehyde the yield was 32 per cent and the efficiency 36 per cent. The efficiency based on isopropenyl acetate was 32 per cent.

EXAMPLE 4

1-acetoxybutadiene-1,3

Using paratoluene sulfonic acid (3.5 parts) as the catalyst, 303 parts of acetoxybutadiene were obtained from 350 parts of crotonaldehyde and 2000 parts of isopropenyl acetate by the same method as was followed in Example 3. The amount of unreacted isopropenyl acetate recovered was 1518 parts. The yield and efficiency based on the crotonaldehyde were 54 per cent and 87 per cent, respectively. The efficiency based on the isopropenyl acetate was 56 per cent.

EXAMPLE 5

1-acetoxy-2-ethylhexene-1

From 256 parts of 2-ethylhexaldehyde and 200 parts of isopropenyl acetate there were obtained 90 parts of 1-acetoxy-2-ethylhexene-1. Sulfuric acid (1.4 parts) was used as a catalyst and the reaction was carried out according to the procedure of Example 1. 1-acetoxy-2-ethylhexane-1 ($n_D^{30}$, 1.4340) was found to be a colorless liquid boiling at 82° C. at a pressure of 10 millimeters. The yield of 1-acetoxy-2-ethylhexene-1 was 31 per cent of the theoretical.

EXAMPLE 6

1-acetoxy-2-ethyl butadiene-1,3

To 456 parts of 2-acetoxybutene prepared according to Example 10, 2 parts of sulfuric acid and 196 parts of 2-ethyl crotonaldehyde were added. The resulting mixture was distilled from a vessel provided with an efficient column about 3 feet long, packed with glass helices. Methyl ethyl ketone which is a by-product of the reaction was removed by distillation until about 80 per cent of the theoretical quantity had been obtained. About 4 hours were required. Thereupon, the remainder was distilled rapidly under reduced pressure in order to remove the product from the catalyst, and the condensate thus obtained was redistilled. There was obtained 155 parts of 1-acetoxy-2-ethyl butadiene which was found to be a colorless liquid having the following properties: boiling point, 56°–57° C. at a pressure of 10 millimeters; $n_D^{30}$, 1.4661. The yield was 56 per cent.

EXAMPLE 7

2-acetoxypentadiene

A mixture containing 451 parts of ethylidene acetone, CH₃CH:CHCOCH₃, 1080 parts of isopropenyl acetate, 2.7 parts of cupric acetate, and 5.4 parts of concentrated sulfuric acid, by weight, was boiled for 3 hours in a still provided with a column 3 feet in length and packed with glass helices. Acetone which was a by-product of the reaction was removed by distillation until about 74 per cent of the theoretical amount had been obtained. Upon careful fractionation of the remaining material 276 parts of acetoxypentadiene and 720 parts of unreacted isopropenyl acetate and 213 parts of unreacted ethylidene acetone were recovered. The product which may be 2-acetoxypentadiene-1,3, or 2-acetoxypentadiene-2,4, or a mixture of them, was found to have the following properties: boiling point, 64° C. at a pressure of 20 millimeters; $n_D^{30}$, 1.4551. The yield was 40 per cent and the efficiency 76 per cent, based on ethylidene acetone. Based on isopropenyl acetate, the efficiency was 52 per cent.

EXAMPLE 8

Cyclohexenyl acetate

A mixture of cyclohexanone (294 parts), isopropenyl acetate (600 parts) and sulfuric acid (6 parts) was found to react smoothly to give cyclohexenyl acetate in 91 per cent yield, based on the cyclohexanone. The reaction was carried out substantially as described in Example 6. The amount of cyclohexenyl acetate obtained was 381 parts and the amount of unreacted isopropenyl acetate recovered was 248 parts. The efficiencies were 91 and 77 per cent, based on the cyclohexanone and the isopropenyl acetate, respectively. Cyclohexenyl acetate was found to be a colorless liquid having the following properties: boiling point, 78° C. at a pressure of 20 millimeters; $n_D^{30}$, 1.4530.

EXAMPLE 9

Alpha-acetoxystyrene

From 360 parts of acetophenone and 600 parts of isopropenyl acetate, there were obtained 251 parts of alpha-acetoxystyrene. Sulfuric acid (3 parts) was used as a catalyst for the reaction which was carried out substantially according to the procedure of Example 5. The alpha-acetoxystyrene ($n_D^{30}$, 1.5282) was obtained as a colorless liquid boiling at a temperature of 106° C. at a pressure of 10 millimeters. The yield was 52 per cent and the efficiency 90 per cent, based on the acetophenone. There was also recovered 333 parts of unreacted isopropenyl acetate for an efficiency, based on the acetate, of 58 per cent.

EXAMPLE 10

*Acetoxybutene*

The enol acetate of methyl ethyl ketone were obtained by the reaction of the ketone (1440 parts) with isopropenyl acetate (2000 parts). The reaction was carried out according to a procedure similar to that of Example 6 using sulfuric acid (6.8 parts) as the catalyst. The amount of resulting product obtained upon separation and distillation was 954 parts. It was found to be a colorless liquid which distilled at 119° to 122° C. at normal atmospheric pressure and had a refractive index at 30° C. ranging from 1.4056 to 1.4064. It was a mixture of the isomers, 2-acetoxybutene-1 and 2-acetoxybutene-2. The yield was 42 per cent. There was recovered 642 parts of unreacted methyl ethyl ketone and 936 parts of unreacted isopropenyl acetate, corresponding to efficiencies of 75 per cent and 79 per cent, respectively.

EXAMPLE 11

*2-acetoxyisoprene*

From a reaction mixture containing methyl isopropenyl ketone and isopropenyl acetate in the proportion of 1 mol of the ketone to 4 mols of acetylating agent, 2-acetoxyisoprene was obtained in a yield of 45 per cent. 2-acetoxyisoprene $CH_2:C(OCOCH_3)C(CH_3):CH_2$ was found to be a colorless liquid with the following properties: boiling point, 45° C. at a pressure of 10 millimeters; $n_D^{30}$, 1.4491. It polymerized rapidly when it was allowed to stand at room temperatures.

EXAMPLE 12

*2-keto-4-acetoxy pentene-3*

A reaction mixture containing 194 parts of acetyl-acetone, 776 parts of isopropenyl acetate, and 1 part of sulfuric acid, was boiled in a still provided with an efficient column which was 3 feet high and packed with glass helices. Acetone, a by-product of the reaction, was removed by distillation until about 89 per cent of the theoretical amount of acetone was obtained as a distillate. About 2 hours were required. The reaction mixture was then neutralized with triamylamine and the product isolated by distillation under reduced pressure. There was obtained 179 parts of 2-keto-4-acetoxypentene-3 which was found to be a colorless liquid having the following properties: boiling point, 69° C. at a pressure of 5 millimeters; $n_D^{30}$, 1.4477. The yield and efficiency were 65 per cent and 95 per cent, respectively based on the acetylacetone. There was also recovered 546 parts of isopropenyl acetate for an efficiency of 55 per cent, based on the acylating agent.

The process is susceptible of modification within the scope of the appended claims.

We claim:

1. A process for making a 1-acyloxy-1,3-diene which comprises forming a mixture of an aldehyde having an aliphatic chain of not less than three carbon atoms attached to the carbonyl group thereof, said aldehyde having an olefinic bond between the second and third carbon atoms thereof and at least one hydrogen atom attached to the fourth carbon atom, and an acylating agent which is the carboxylic acid ester of the enol form of a ketone having a lower boiling point than the aldehyde and reacting said mixture in the presence of an esterification catalyst.

2. A process for making a 1-acyloxy-1,3-diene which comprises forming a mixture of an aldehyde having an aliphatic chain of not less than three carbon atoms attached to the carbonyl group thereof, said aldehyde having an olefinic bond between the second and third carbon atoms thereof and at least one hydrogen atom attached to the fourth carbon atom, and an acylating agent which is the carboxylic acid ester of the enol form of a ketone having a lower boiling point than the aldehyde and reacting said mixture at a temperature of 0° to 275° C. in the presence of an esterification catalyst.

3. A process for making a 1-acyloxy-1,3-diene which comprises forming a mixture of an aldehyde having an aliphatic chain of not less than three carbon atoms attached to the carbonyl group thereof, said aldehyde having an olefinic bond between the second and third carbon atoms thereof and at least one hydrogen atom attached to the fourth carbon atom, and an acylating agent which is the carboxylic acid ester of the enol form of a ketone having a lower boiling point than the aldehyde and reacting said mixture at a temperature of about 90° to 200° C. in the presence of an esterification catalyst.

4. A process for making a 1-acyloxy-1,3-diene which comprises forming a mixture of an aldehyde having an aliphatic chain of not less than three carbon atoms attached to the carbonyl group thereof, said aldehyde having an olefinic bond between the second and third carbon atoms thereof and at least one hydrogen atom attached to the fourth carbon atom, and an acylating agent which is the carboxylic acid ester of the enol form of a ketone having a lower boiling point than the aldehyde and reacting said mixture in the presence of a small amount of concentrated sulfuric acid.

5. A process for making a 1-acyloxy-1,3-diene which comprises forming a mixture of an aldehyde having an aliphatic chain of not less than three carbon atoms attached to the carbonyl group thereof, said aldehyde having an olefinic bond between the second and third carbon atoms thereof and at least one hydrogen atom attached to the fourth carbon atom; an acylating agent which is a carboxylic acid ester of the enol form of a ketone having a lower boiling point than the aldehyde; and a small amount of an esterification catalyst, and heating said mixture in the liquid phase to its refluxing temperature and distilling therefrom ketone formed in the reaction.

6. A process for making a 1-acyloxy-1,3-diene which comprises forming a mixture of an aldehyde having an aliphatic chain of not less than three carbon atoms attached to the carbonyl group thereof, said aldehyde having an olefinic bond between the second and third carbon atoms thereof and at least one hydrogen atom attached to the fourth carbon atom; an acylating agent which is a saturated, open-chain carboxylic acid ester of the enol form of a ketone having a lower boiling point than the aldehyde; and a small amount of an esterification catalyst, and heating said mixture in the liquid phase to its refluxing temperature and distilling therefrom ketone formed in the reaction.

7. A process for making a 1-acetoxy-1,3 diene which comprises forming a mixture of an aldehyde having an aliphatic chain of not less than three carbon atoms attached to the carbonyl group thereof, said aldehyde having an olefinic bond between the second and third carbon atoms thereof and at least one hydrogen atom attached to the fourth carbon atom, and an acetylating agent which is the acetic acid ester of the enol form of a ketone having a lower boiling point than the aldehyde and heating said mixture to a temperature of 90° to 200° C. in the presence of an esterification catalyst.

8. A process for making a 1-acetoxy-1,3 diene which comprises forming a mixture of an aldehyde having an aliphatic chain of not less than three carbon atoms attached to the carbonyl group thereof, said aldehyde having an olefinic bond between the second and third carbon atoms thereof and at least one hydrogen atom attached to the fourth carbon atom, and an acetylating agent which is the acetic acid ester of the enol form of a lower aliphatic ketone having a lower boiling point than the aldehyde and heating said mixture to a temperature of 90° to 200° C. in the presence of an esterification catalyst.

9. A process for making a 1-acetoxy-1,3 diene which comprises forming a mixture of an aldehyde having an aliphatic chain of not less than three carbon atoms attached to the carbonyl group thereof, said aldehyde having an olefinic bond between the second and third carbon atoms thereof and at least one hydrogen atom attached to the fourth carbon atom, and isopropenyl acetate as an acetylating agent and heating said mixture to a temperature of 90° to 200° C. in the presence of an esterification catalyst.

10. A process for making 1-acetoxybutadiene-1,3 which comprises forming a mixture of crotonaldehyde, an excess of isopropenyl acetate as an acetylating agent, and a small amount of an esterification catalyst, and heating said mixture to its refluxing temperature and distilling therefrom acetone formed in the reaction.

11. A process for making 1-acetoxy-2-ethyl butadiene-1,3 which comprises forming a mixture of 2-ethyl crotonaldehyde, an excess of isopropenyl acetate as an acetylating agent, and a small amount of an esterification catalyst, and heating said mixture to its refluxing temperature and distilling therefrom acetone formed in the reaction.

WILLIAM M. QUATTLEBAUM, JR.
CHARLES A. NOFFSINGER.

REFERENCES CITED

The following references are of record in the file of this patent:

UNITED STATES PATENTS

| Number | Name | Date |
|---|---|---|
| 1,872,834 | Skirrow | Aug. 23, 1932 |
| 2,215,180 | Kaufler | Sept. 17, 1940 |